US008073276B2

(12) United States Patent
Zhong (10) Patent No.: US 8,073,276 B2
(45) Date of Patent: Dec. 6, 2011

(54) DE-RINGING FILTER FOR DECOMPRESSED VIDEO DATA

(75) Inventor: Lefan Zhong, San Jose, CA (US)

(73) Assignee: Vivante Corporation, Sunnyvale, CA (US)

( * ) Notice: Subject to any disclaimer, the term of this patent is extended or adjusted under 35 U.S.C. 154(b) by 1184 days.

(21) Appl. No.: 11/786,148

(22) Filed: Apr. 10, 2007

(65) Prior Publication Data

US 2008/0253682 A1    Oct. 16, 2008

(51) Int. Cl.
*G06K 9/40* (2006.01)

(52) U.S. Cl. ........ 382/254; 382/166; 382/211; 382/232; 382/233

(58) Field of Classification Search ................. 382/254, 382/166, 211, 232, 233, 243, 260, 261

See application file for complete search history.

(56) References Cited

U.S. PATENT DOCUMENTS

| 5,802,218 | A  | * | 9/1998 | Brailean ................ 382/275 |
| 6,236,764 | B1 | * | 5/2001 | Zhou .................... 382/266 |
| 2004/0081368 | A1 | * | 4/2004 | Mathew et al. ........... 382/268 |
| 2004/0247034 | A1 | * | 12/2004 | Zhong et al. ........ 375/240.29 |
| 2005/0244063 | A1 | * | 11/2005 | Kwon et al. ............ 382/233 |
| 2006/0110062 | A1 | * | 5/2006 | Chiang et al. ........... 382/260 |
| 2007/0140574 | A1 | * | 6/2007 | Yamaguchi et al. ....... 382/233 |

* cited by examiner

*Primary Examiner* — Wesley Tucker
*Assistant Examiner* — Aklilu Woldemariam
(74) *Attorney, Agent, or Firm* — David R. Stevens; Stevens Law Group (57) ABSTRACT

A post processing apparatus of a graphics controller to filter decompressed video data. An embodiment of the apparatus includes a buffer and a de-ringing filter. The buffer is configured to read a pixel line of video data from memory. The pixel line includes pixels from adjacent macroblocks of the video data. The de-ringing filter is coupled to the buffer. The de-ringing filter is configured to identify a maximum pixel jump between adjacent pairs of pixels in the pixel line and to apply a de-ringing filter to a pixel within a pixel subset of the pixel line in response to a determination that the pixel is not an edge pixel. The determination that the pixel is not an edge pixel is based on the identified maximum pixel jump.

8 Claims, 10 Drawing Sheets

DE-RINGING FILTER FOR DECOMPRESSED VIDEO DATA

BACKGROUND

Video compression is used to make video data files such as full-length movies relatively manageable for storage (e.g., in optical storage media), processing, and transmission. In general, video compression is achieved by eliminating redundant and irrelevant information. Video information typically does not vary significantly over time and space because video images typically consist of smooth regions of color across the screen. Hence, a significant part of the video information in an image is predictable and therefore redundant. Accordingly, video compression is used to remove the redundant information and leave only the unpredictable information.

Irrelevant video image information is information that cannot be seen by the human eye under certain reasonable viewing conditions. For example, the human eye does not readily perceive noise at high spatial frequencies (compared to noise at low spatial frequencies) or loss of details immediately before and after a scene change. Accordingly, video compression is also used to remove irrelevant information. The combination of redundant information removal and irrelevant information removal facilitates relatively high compression ratios for video data files.

Moving Picture Experts Group (MPEG) is a family of standards for audio-visual information in a digital compressed format. MPEG is a recognized standard of the International Standards Organization (ISO). MPEG compression is one type of video compression that incorporates various conventional techniques to remove redundant and irrelevant information from video data files. Some of these conventional techniques include motion-compensated prediction, discrete cosine transform (DCT), quantization, and variable-length coding (VLC). DCT is an algorithm that converts pixel data into sets of spatial frequencies with associated coefficients. Due to the non-uniform distribution of the DCT coefficients (because most of the non-zero DCT coefficients of an image tend to be located in a general area), VLC is typically used to exploit this distribution characteristic to distinguish between non-zero DCT coefficients and zero DCT coefficients. In so doing, redundant/predictable information can be removed. Additionally, having decomposed the video image into spatial frequencies under DCT means that higher frequencies via their associated DCT coefficients can be coded with less precision than the lower frequencies via their associated DCT coefficients. This allows irrelevant information to be removed. Hence, quantization may be generalized as an operation to weight the DCT coefficients based on the amount of noise that the human eye can tolerate at each spatial frequency so that a reduced set of coefficients can be generated.

However, when a highly compressed video data file is decompressed, image degradations involving noise artifacts may occur in the decompressed video images. Generally, there are two types of degradation noise artifacts: blocking artifacts and ringing artifacts. Blocking artifacts are typically manifested as discontinuities between adjacent video pixel data blocks. Blocking artifacts are created when DCT coefficients of video pixel blocks are quantized and processed independently without consideration for the pixel correlation between adjacent blocks. Ringing artifacts are typically manifested as local flickering near an edge. Ringing artifacts are created when high frequency DCT coefficients are truncated as a result of coarse quantizations.

Conventional de-ringing filter technology is referenced in the MPEG standards. However, the conventional de-ringing filter technology implements a two-dimensional (2D), non-linear filter, which is relatively complicated. Additionally, the conventional 2D, non-linear filter takes three scans to implement.

SUMMARY

Embodiments of an apparatus are described. In one embodiment, the apparatus is a post processing apparatus of a graphics controller to filter decompressed video data. An embodiment of the post processing apparatus includes a buffer and a de-ringing filter. The buffer is configured to read a pixel line of video data from memory. The pixel line includes pixels from adjacent macroblocks of the video data. The de-ringing filter is coupled to the buffer. The de-ringing filter is configured to identify a maximum pixel jump between adjacent pairs of pixels in the pixel line and to apply a de-ringing filter to a pixel within a pixel subset of the pixel line in response to a determination that the pixel is not an edge pixel. The determination that the pixel is not an edge pixel is based on the identified maximum pixel jump. Other embodiments of the apparatus are also described.

Embodiments of a method are also described. In one embodiment, the method is a method for filtering decompressed video to compensate for ringing artifacts. The method includes reading a pixel line of video data. The pixel line includes pixels from adjacent macroblocks of the video data. The method also includes identifying a maximum pixel jump between adjacent pairs of pixels in the pixel line. The method also includes applying a de-ringing filter to a pixel within a pixel subset of the pixel line in response to a determination that the pixel is not an edge pixel. The determination that the pixel is not an edge pixel is based on the identified maximum pixel jump. Other embodiments of the method are also described.

As used herein, coupled components or entities are intended to broadly include components that are physically connected, and also includes entities that are not physically connected but that are able to communicate or otherwise transmit a signal or information by various means. Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

In the following detailed description, numerous specific details are set forth in order to provide a thorough understanding of embodiments of the present invention. However, it will be obvious to one skilled in the art that the present invention may be practiced without these specific details. In other instances well known methods, procedures, components, and circuits have not been described in detail for the sake of brevity and clarity, so as not to unnecessarily obscure aspects of the described embodiments. Additionally, although the following detailed description references the MPEG standard for compressing video image data, some embodiments are also applicable to other video compression schemes.

Figure 1:
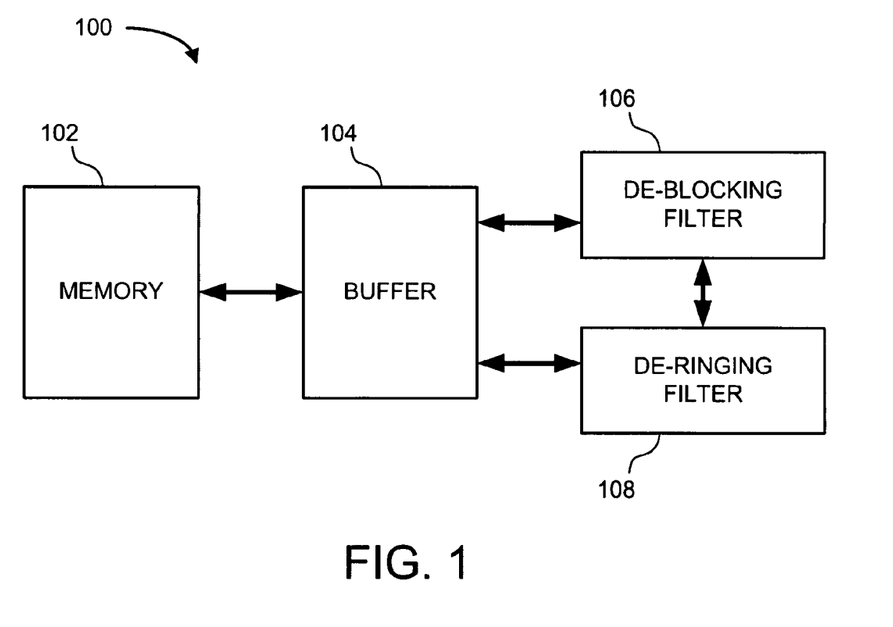
FIG. 1 illustrates a schematic block diagram of one embodiment of a post processing architecture.

FIG. 1 illustrates a schematic block diagram of one embodiment of a post processing architecture 100. In one embodiment, the post processing architecture 100 implements a "pipelined" filtering process. The illustrated post processing architecture 100 includes a memory device 102, a filter buffer 104, a de-blocking filter 106, and a de-ringing filter 108. Although the physical implementation of the post processing architecture 100 may vary, the depicted memory device 102, filter buffer 104, de-blocking filter 106, and de-ringing filter 108 are coupled together to allow data transfers between the memory 102 and the buffer 104, the buffer 104 and the de-blocking filter 106, the buffer 104 and the de-ringing filter 108, and the de-blocking filter 106 and the de-ringing filter 108. Such data transfers may be accomplished directly or indirectly among the various component parts. Additionally, the data transfers may be implemented in serial or parallel communication channels using one or more data transmission protocols. In one embodiment, the component parts of the post processing architecture 100 are serially connected to each other to allow decompressed video image data to be first provided to the de-blocking filter 106 for removing blocking artifacts and then to the de-ringing filter 108 for removing ringing artifacts without the need of an extra memory access. Other embodiments may implement other serial or parallel configurations.

In one embodiment, the memory 102 stores decompressed (i.e., processed) video image data. The de-blocking filter 106 and the de-ringing filter 108 access the decompressed video image data from the buffer 104. Alternatively, the de-ringing filter 108 may access the decompressed video image data directly from the de-blocking filter 106. In one embodiment, the de-blocking filter 106 and the de-ringing filter 108 are one-dimensional (1D) filters. In alternative embodiments, two-dimensional (2D) filters or a combination of 1D and 2D filters may be implemented. Additional details of the de-blocking filter 106 and the de-ringing filter 108 are provided below.

Figure 2:
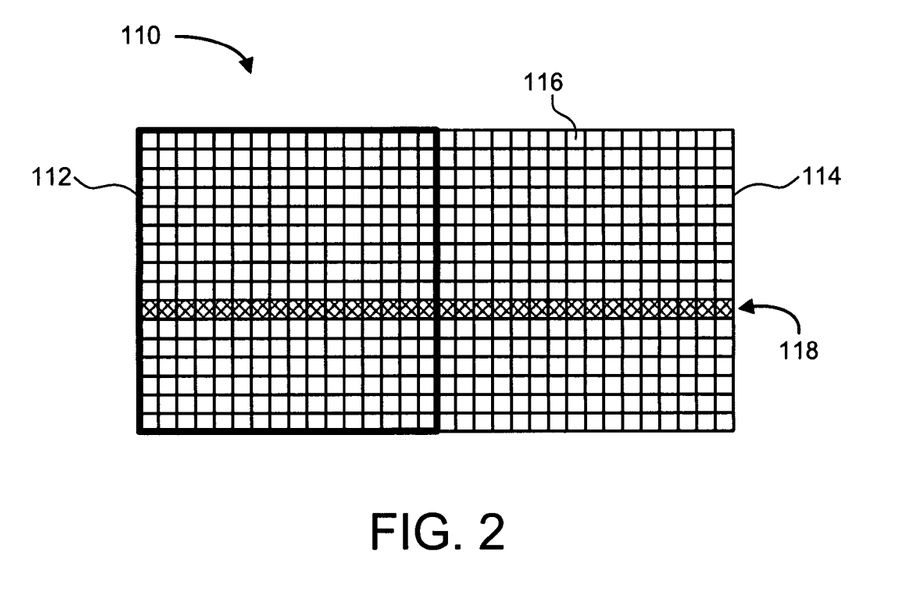
FIG. 2 illustrates a schematic diagram of one embodiment of a pair of horizontally adjacent macroblocks of pixels.

FIG. 2 illustrates a schematic diagram of one embodiment of a pair 110 of horizontally adjacent macroblocks 112 and 114 of pixels 116. Each of the depicted macroblocks 112 and 114 includes a sixteen by sixteen array of pixels 116, for a total of 256 pixels 116. Similar macroblock designations may be used to group all of the pixels 116 on a display device. This designation facilitates processing of the video data corresponding to the various pixels 116. In this way, the video data may be processed in blocks such as the macroblocks 112 and 114. Although the depicted macroblocks 112 and 114 are shown as a sixteen by sixteen array of pixels 116, other implementations of the macroblocks 112 and 114 may include fewer or more pixels 116. For example, a macroblock could be implemented having an eight by eight array of pixels 116.

For ease of explanation, the left macroblock 112 is highlighted (i.e., outlined) to indicated that the left macroblock 112 is designated as a current macroblock, or current block of video data, for a particular processing or display operation. In one embodiment, each of the macroblocks 112 and 114 on a display device may be individually designated as a current block for specific processing operations. This allows the video data to be processed in blocks, thus simplifying the processing and display operations.

Additionally, the pixels 116 within adjacent macroblocks 112 and 114 may be designated as a pixel line 118. In the case of horizontally adjacent macroblocks 112 and 114, the pixel line 118 also may be referred to as a pixel row. Since each macroblock 112 and 114 has sixteen pixels 116 in each row, the pixel line 118 includes 32 pixels 116. Alternatively, a pixel line 118 may include fewer than all of the pixels 116 in a pixel row. For example, in one embodiment, a pixel line 118 includes the middle eight pixels 116, instead of all sixteen pixels 116, from each macroblock 112 and 114. Pixel lines 118 are used as described below.

Figure 3:
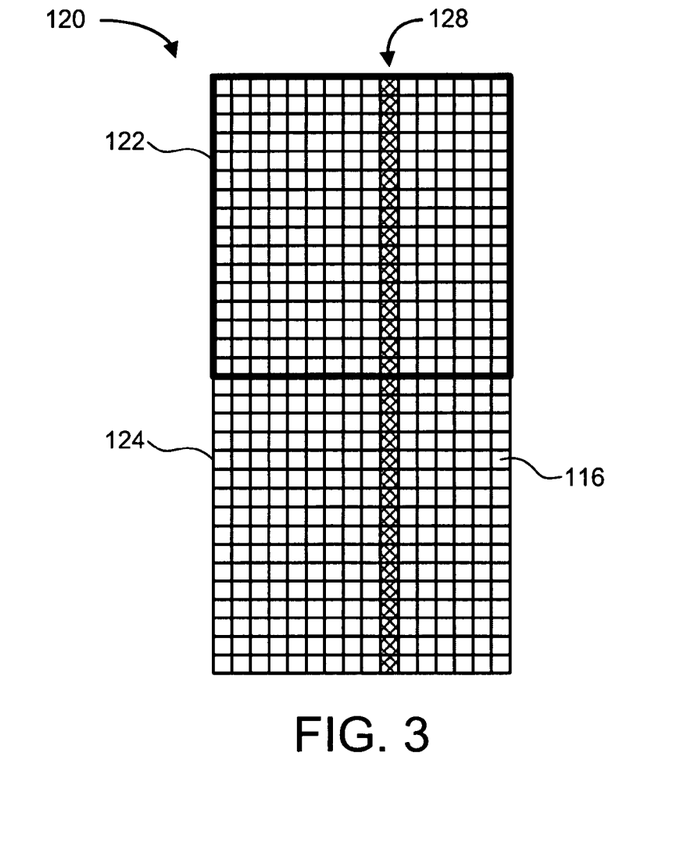
FIG. 3 illustrates a schematic diagram of one embodiment of a pair of vertically adjacent macroblocks of pixels.

FIG. 3 illustrates a schematic diagram of one embodiment of a pair 120 of vertically adjacent macroblocks 122 and 124 of pixels 116. In one embodiment, the upper macroblock 122 is designated as a current macroblock. The vertically adjacent macroblocks 122 and 124 are substantially similar to the horizontally adjacent macroblocks 112 and 114 shown in FIG. 2. Each macroblock 122 and 124 includes a sixteen by sixteen array of pixels 116. Additionally, the macroblocks 122 and 124 may include a pixel line 128. Since the pixel line 128 is oriented in a vertical direction (due to the spatial relationship of the macroblocks 122 and 124), the pixel line 128 also may be referred to as a pixel column. In many aspects, the pixel line 118 and the pixel line 128 are substantially similar, except for their orientation.

Figure 4:
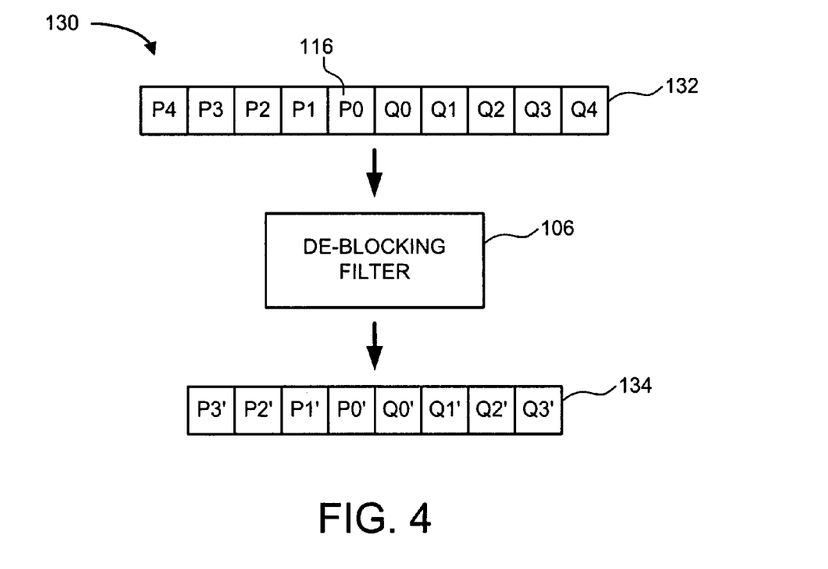
FIG. 4 illustrates a schematic block diagram of one embodiment of a de-blocking architecture.

FIG. 4 illustrates a schematic block diagram of one embodiment of a de-blocking architecture 130. In general, the illustrated de-blocking architecture 130 facilitates smoothing out the boundaries of adjacent macroblocks such as the macroblocks 112 and 114 and the macroblocks 122 and 124. In one embodiment, the output of the de-blocking architecture 130 is used for display purposes, but is not used as a reference frame. Additionally, in one embodiment, the de-blocking architecture 130 is used after a complete frame is decoded.

The illustrated de-blocking architecture 130 shows ten pixels 116 (e.g., ten of the 32 pixels 116 in a typical pixel line 118) of an input pixel line 132. The pixels 116 are designated as P0-P4 and Q0-Q4. In one embodiment, pixels P0-P4 belong to one macroblock 112, and pixels Q0-Q4 belong to another, adjacent macroblock 114. The boundary between pixels P0 and Q0 represents the boundary between the two adjacent macroblocks 112 and 114. As the indices increase (from 0 to 4), the corresponding pixels 116 are further from the boundary between the adjacent macroblocks 112 and 114.

In one embodiment, the ten pixels 116 of the input pixel line 132 are input into the de-blocking filter 106. The de-blocking filter implements de-blocking operations to smooth out the boundary between the two macroblocks 112 and 114 for the input pixel line 132. In turn, the de-blocking filter 106 outputs, for example, eight new values, P0'-P3' and Q0'-Q3' of an output pixel line 134, to replace the corresponding original input values, P0-P3 and Q0-Q3, of the pixel 116 of the input pixel line 132. In one embodiment, the new grayscale or colorscale values of the pixels 116 of the output pixel line 134 are different from the values of the pixels 116 of the input pixel line 132 so that the blocking artifacts between the macroblocks 112 and 114 are reduced.

Figure 5:
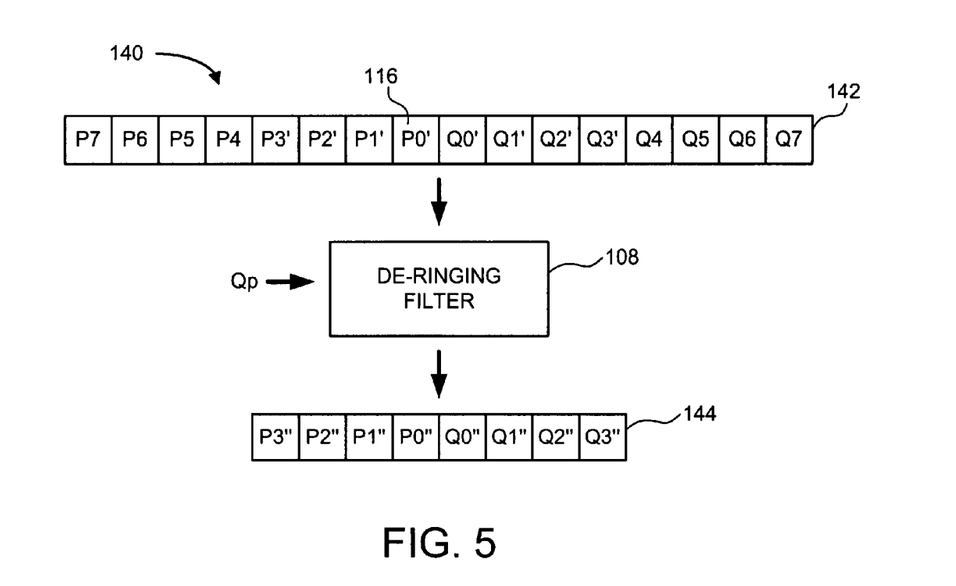
FIG. 5 illustrates a schematic block diagram of one embodiment of a de-ringing architecture.

FIG. 5 illustrates a schematic block diagram of one embodiment of a de-ringing architecture 140. In general, the illustrated de-ringing architecture 140 facilitates removal of ringing artifacts for edges near the boundaries of adjacent macroblocks such as the macroblocks 112 and 114 and the macroblocks 122 and 124. In one embodiment, the de-ringing architecture 140 is particularly useful for low bit rate video.

The illustrated de-ringing architecture 140 shows sixteen pixels 116 (e.g., sixteen of the 32 pixels 116 in a typical pixel line 118) of an input pixel line 142. The pixels 116 are designated as P0'-P3', P4-P7, Q0'-Q3', and Q4-Q7. In one embodiment, the pixels P0'-P3' and the pixels Q0'-Q3' are the same as the pixels 116 of the output pixel line 134 from the de-blocking architecture 130 described above. In other words, the de-ringing architecture 140 may use the output pixel line 134 of the de-blocking architecture 130 as part of the input pixel line 142 of the de-ringing architecture 140 to remove ringing artifacts from adjacent macroblocks.

In one embodiment, the sixteen pixels 116 of the input pixel line 142 are input into the de-ringing filter 108. The de-ringing filter 108 implements de-ringing operations to remove ringing artifacts from the two macroblocks 112 and 114 for the input pixel line 142. In turn, the de-ringing filter 108 outputs, for example, eight new values, P0"-P3" and Q0"-Q3" of an output pixel line 144, to replace the corresponding original input values, P0'-P3' and Q0'-Q3', of the pixels 116 of the input pixel line 142. In one embodiment, the new grayscale or colorscale values of the pixels 116 of the output pixel line 144 are different from the values of the pixels 116 of the input pixel line 142 so that ringing artifacts of the macroblocks 112 and 114 are reduced.

In one embodiment, the de-ringing filter 108 may implement a variety of algorithms, functions, and operations to facilitate removal of the ringing artifacts. At least one implementation of the de-ringing filter 108 is much simpler than conventional implementations of de-ringing filters. Although the following description conveys an exemplary functional embodiment of a one-dimensional (1D) de-ringing filter, other embodiments may implement other de-ringing filters using similar design criteria and considerations.

Additionally, the following description refers to the quantization scale and one or more quantization factors, or quantization scale values. The use of the quantization scale is well known in the art and described in substantial detail in the MPEG standards. Accordingly, a more detailed description of the quantization scale is not provided herein. In some embodiments, the quantization scale value used corresponds to a particular macroblock 112 or 114. In other embodiments, where a quantization scale value is used for calculations involving pixels 116 from different macroblocks 112 and 114, the quantization scale value may be a combination (e.g., average) of the quantization scale values for the individual macroblocks 112 and 114. Other embodiments may use other derivation so of the quantization scale value for one or more macroblocks.

Figure 6:
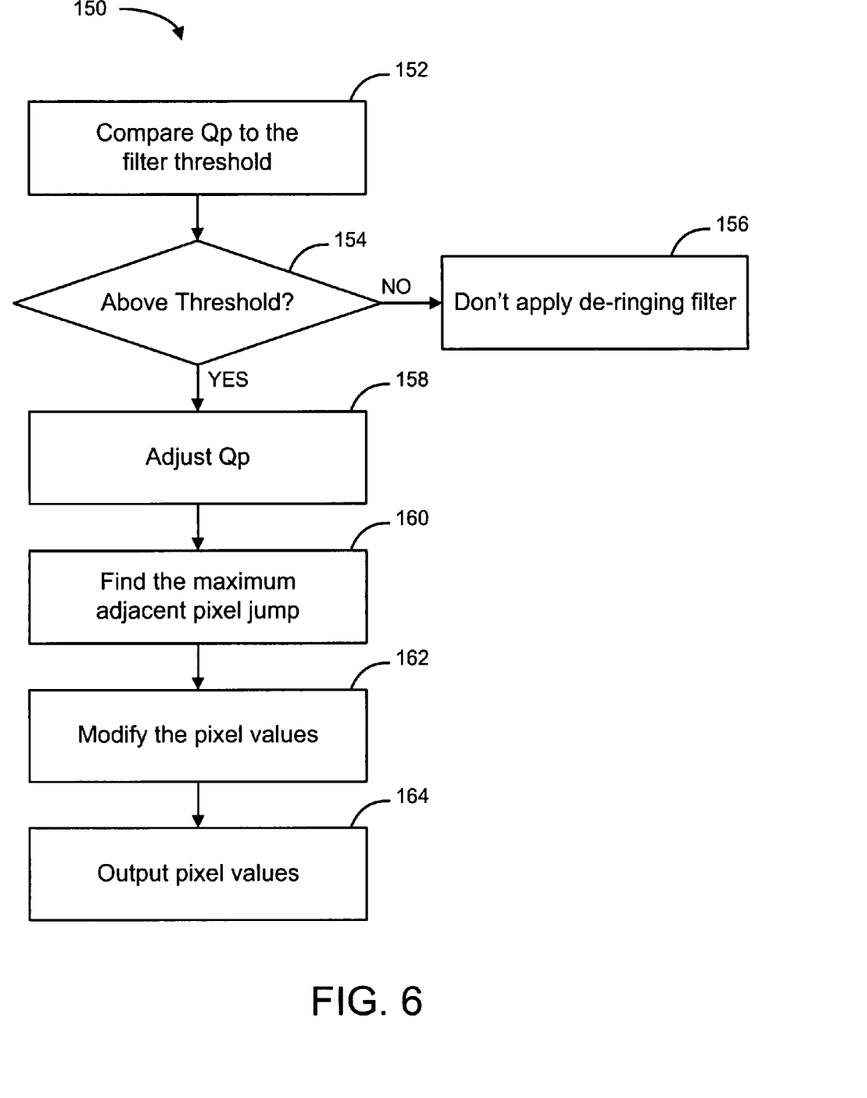
FIG. 6 illustrates a schematic flow chart diagram of one embodiment of a post processing method for filtering decompressed video data.

FIG. 6 illustrates a schematic flow chart diagram of one embodiment of a post processing method 150 for filtering decompressed video data. Some embodiments of the post processing method 150 may be implemented with the post processing architecture 100 of FIG. 1. Other embodiments of the post processing method 150 may be implemented with other post processing architectures.

In one embodiment, the de-ringing filter 108 determines if de-ringing filtering is enabled. In order to make this determination, the de-ringing filter 108 compares 152 the quantization scale value to a filter threshold. The quantization scale value corresponds to a current macroblock such as the macroblock 112 of the pair 110 of macroblocks 112 and 114. The de-ringing filter 108 specifically determines 154 if the quantization scale value is above the filter threshold. If the quantization scale value is not above the filter threshold, then the de-ringing filter 108 is not enabled and does not apply 156 de-ringing filtering to the decompressed video data. However, if the quantization scale value is above the filter threshold, then the de-ringing filter 108 is enabled.

When the de-ringing filter 108 is enabled, the de-ringing filter 108 may adjust 158 the quantization scale value. Adjusting the quantization scale value provides flexibility in image quality. For example, if the quantization scale value is increased, then more noise will be removed from the image, and the resulting image will be softer. Alternatively, if the quantization scale value is decreased, then less noise will be removed from the image, and the image will have a higher frequency. In one embodiment, the quantization scale value is adjusted according to the following:

$$Q_p' = Q_p \times M \times w_d$$

in which $Q_p'$ designates a new quantization scale value, $Q_p$ designates an original quantization scale value, M designates a post de-ringing factor, and $w_d$ designates a post de-ringing weighting factor. In some embodiments, the de-ringing weighting factor is three. In another embodiment, the post de-ringing weighting factor is 1/16 (which may be implemented using integer division, rather than floating point multiplication), and the post de-ringing factor is between about three and 64.

In an alternative embodiment, the equation shown above can be modified to exclude the post de-ringing weighting factor, $w_d$. However, using the post de-ringing weighting factor may facilitate a hardware implementation to avoid floating point calculations. Where the post de-ringing weighting factor is excluded, the de-ringing weighting factor may be between about 0.25 and 4, or another value. In other embodiments, other variations of the quantization scale value adjustment may be implemented.

Figure 7:
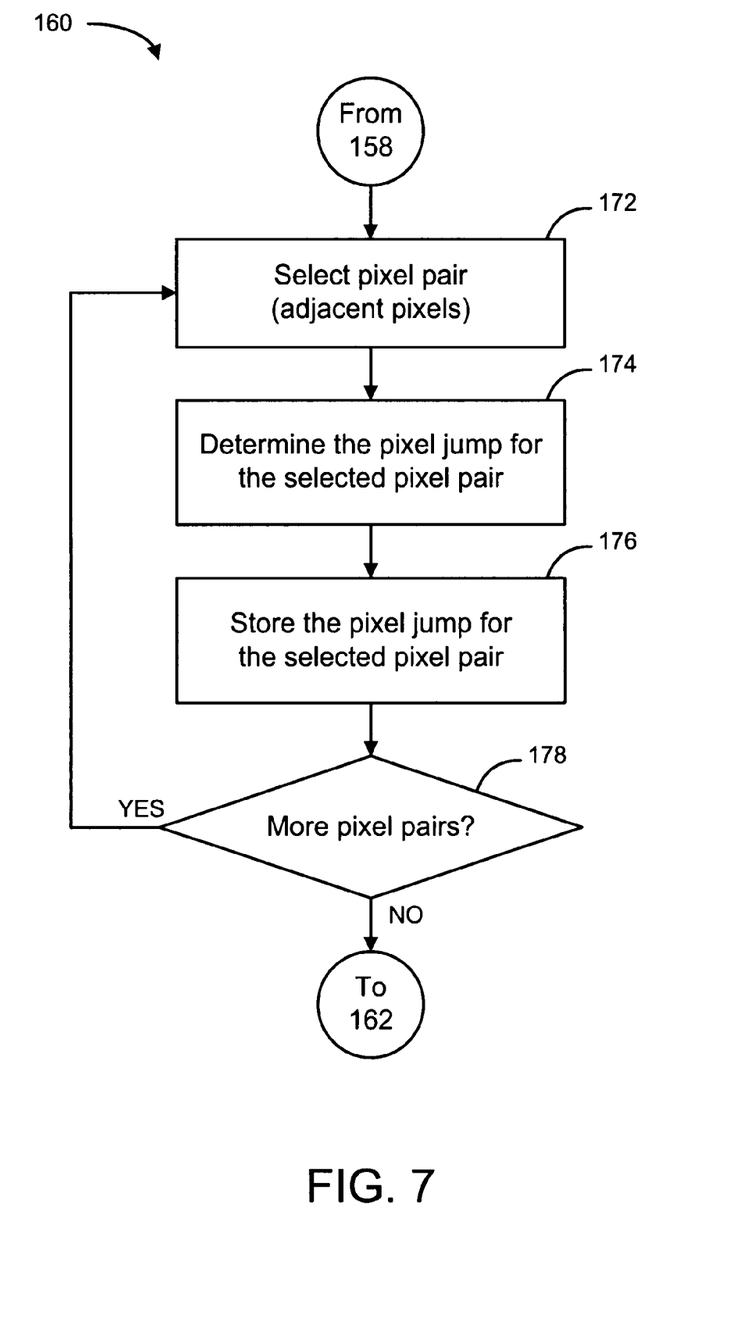
FIG. 7 illustrates a schematic flow chart diagram of a more detailed embodiment of the pixel jump operation of the post processing method of FIG. 6.

After adjusting the quantization scale value, the de-ringing filter 108 finds 160 the maximum adjacent pixel jump for the input pixel line 142 input into the de-ringing filter 108. In other words, the de-ringing filter 108 find the largest difference in grayscale or colorscale values between a pixel 116 and the adjacent pixels 116. In one embodiment, the maximum adjacent pixel jump is found by finding the difference between each pair of adjacent pixels 116 in the input pixel line 142. As an example, the de-ringing filter 108 may determine the absolute values of the differences between P0 and P1, between P1 and P2, between P3 and P4, between P4 and P5, between P5 and P6, and between P6 and P7. The de-ringing filter 108 also may determine the absolute values of the differences between Q0 and Q1, between Q1 and Q2, between Q2 and Q3, between Q3 and Q4, between Q4 and Q5, between Q5 and Q6, and between Q6 and Q7. Additionally, the de-ringing filter 108 may determine the absolute value of the difference between P0 and Q0. Then, the de-ringing filter 108 may find the biggest difference out of all of the differences between adjacent pixels. The biggest difference is then designated as the maximum adjacent pixel jump for the input pixel line 142. This can also be written as follows:

$$\max\left\{\begin{array}{c}(|P_i - P_{i+1}|, |Q_i - Q_{i+1}|)_{i=0,1,\ldots 6}\\ |P_0 - Q_0|\end{array}\right.$$

in which $P_i$ designates a value of a pixel 116 in a first macroblock 112, $P_{i+1}$ designates a value of an adjacent pixel 116 in the same macroblock 112, $Q_i$ designates a value of a pixel 116 in an adjacent macroblock 114, and $Q_{i+1}$ designates a value of an adjacent pixel 116 in the adjacent macroblock 114. Additional details of the pixel jump operation 160 are provided with reference to FIG. 7.

After the de-ringing filter 108 finds the maximum adjacent pixel jump of the input pixel line 142, the de-ringing filter 108 then modifies 162 the pixel values and outputs 164 some or all of the pixel values in the output pixel line 144. In one embodiment, the de-ringing filter 108 outputs all the pixel values, whether or not they are modified. In another embodiment, the de-ringing filter 108 outputs the modified pixel values and does not output the unchanged pixel values. Although some embodiments may modify several of the pixel values, other embodiments may modify few, if any, of the pixel values. In one embodiment, whether or not the pixel values are modified depends, at least in part, on whether or not the corresponding pixels are determined to be edge pixels. Additional details of the pixel modification operation 162 are provided with reference to FIG. 8.

FIG. 7 illustrates a schematic flow chart diagram of a more detailed embodiment of the pixel jump operation 160 of the post processing method 150 of FIG. 6. Although certain operations are described in relation to the pixel jump operation 160, some embodiments of the de-ringing filter 108 may use fewer or more operations to implement the pixel jump operation 160.

In order to implement the pixel jump operation 160, the de-ringing filter 108 selects 172 a pixel pair of adjacent pixels 116 of the input pixel line 142. For example, the de-ringing filter 108 may select pixels P0 and P1. The de-ringing filter 108 then determines 174 the pixel jump for the selected pixels 116. For example, the de-ringing filter 108 determines the grayscale or colorscale difference between pixels P0 and P1. The de-ringing filter 108 then stores 176 the pixel jump for the selected pixel pair. The de-ringing filter 108 then determines 178 if there are more pixel pairs and, if so, repeats the same operations for each of the pixel pairs in the input pixel line 142. After the de-ringing filter 108 has determined the pixel jump for all of the pixel pairs in the input pixel line 142, the pixel jump operation 160 then ends. In another embodiment, the de-ringing filter 108 may determine the pixel jump for a subset of the pixel pairs in the input pixel line 142.

Figure 8:
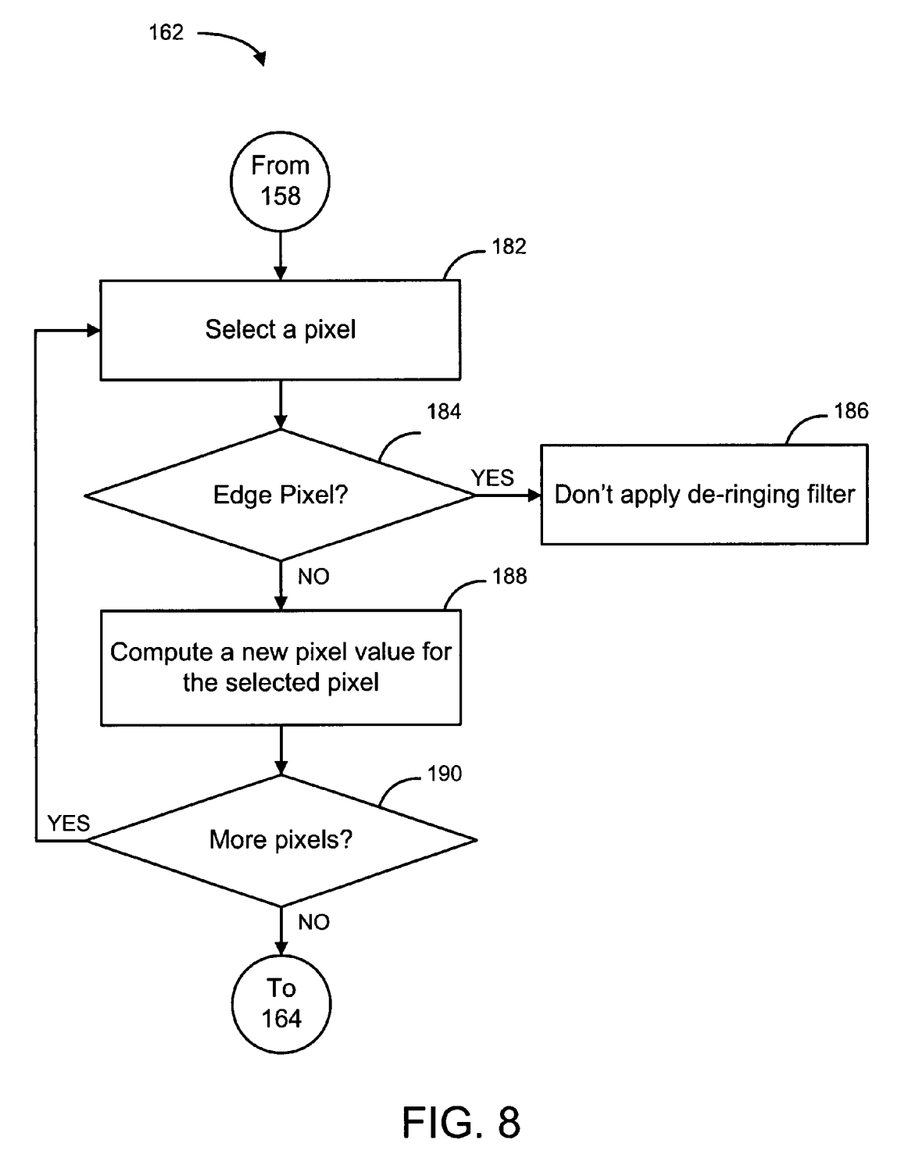
FIG. 8 illustrates a schematic flow chart diagram of a more detailed embodiment of the pixel modification operation of the post processing method of FIG. 6.

FIG. 8 illustrates a schematic flow chart diagram of a more detailed embodiment of the pixel modification operation 162 of the post processing method 150 of FIG. 6. Although certain operations are described in relation to the pixel modification operation 162, some embodiments of the de-ringing filter 108 may use fewer or more operations to implement the pixel modification operation 162.

In order to implement the pixel modification operation 162, the de-ringing filter 108 selects 182 a pixel 116 of the input pixel line 142. In one embodiment, the de-ringing filter 108 only selects a pixel 116 from a subset of pixels such as the middle eight pixels 116 (e.g., pixels P0-P3 and Q0-Q3) within the input pixel line 142. The de-ringing filter 108 then determines 184 if the selected pixel 116 is an edge pixel. In one embodiment, the de-ringing filter 108 determines if the selected pixel 116 is an edge pixel according to the following:

$$|P_i - P_{i-1}| < P_{max} \times w_e \text{ and } |P_i - P_{i+1}| < P_{max} \times w_e$$

in which $P_i$ designates a current value of the selected pixel 116, $P_{i-1}$ designates a value of a first adjacent pixel 116, $P_{i+1}$ designates a value of a second adjacent pixel 116, $P_{max}$ designates the identified maximum pixel jump, and $w_e$ designates the edge weighting factor. In other words, the de-ringing filter 108 determines if the pixel jumps from the current pixel to each of the adjacent pixels is below a threshold value that is dependent on the edge weighting factor and the maximum adjacent pixel jumps for the two pairs of pixels 116. In one embodiment, the edge weighting factor is approximate 0.75. Alternatively, the edge weighting factor may be within a range of 0.65 to 0.85. In another embodiment, the edge weighting factor may be within a range of 0.5 to 0.95.

If the values are not below the threshold value, then the selected pixel 116 is designated as an edge pixel. If the selected pixel 116 is an edge pixel (i.e., the values for the selected pixel 116 are not below the threshold value), then the de-ringing filter 108 is not applied 186 to the selected pixel 116. Otherwise, if the values are below the threshold value, then the selected pixel 116 is not an edge pixel. If the selected pixel 116 is not an edge pixel, then the de-ringing filter 108 computes 188 a new pixel value for the selected pixel 116. In one embodiment, the new value for the selected pixel 116 is computed according to the following:

$$P_{new} = \frac{w_p \times P_i + P_{i-1} + P_{i+1} + P_{bias}}{2 + w_p}$$

in which $P_{new}$ designates the new value of the selected pixel 116, $w_p$ designates a pixel weighting factor, $P_i$ designates the current value of the selected pixel 116, $P_{i-1}$ designates a value of a first adjacent pixel, $P_{i+1}$ designates a value of a second adjacent pixel, and $P_{bias}$ designates a predefined bias factor. In one embodiment, the pixel weighting value is approximately 2.0 and the bias factor is approximately 2.0. However, some embodiments may use different values for the pixel weighting factor and the bias factor.

Additionally, calculating the new value of the selected pixel 116 may clamp the new pixel value within a clamping range according to the following:

$$P_{clamp} = (P_i + Q_p, P_i - Q_p)$$

wherein $P_{clamp}$ designates the clamping range, $P_i$ designates the current pixel value, and $Q_p$ designates a quantization scale value. In one embodiment, the original quantization scale value, $Q_p$, may be used. Alternatively, the modified quantization scale value, $Q_p'$, may be used.

After computing the new pixel value for the selected pixel 116, the de-ringing filter 108 then determines if there are more pixels 116 (or in a designated subset of pixels 116) in the input pixel line 142. If there are more pixels 116, then the de-ringing filter 108 continues to apply the same operations to other selected pixels 116. After all of the selected pixels 116 have been processed, the depicted pixel modification operation 162 then ends.

Figure 9:
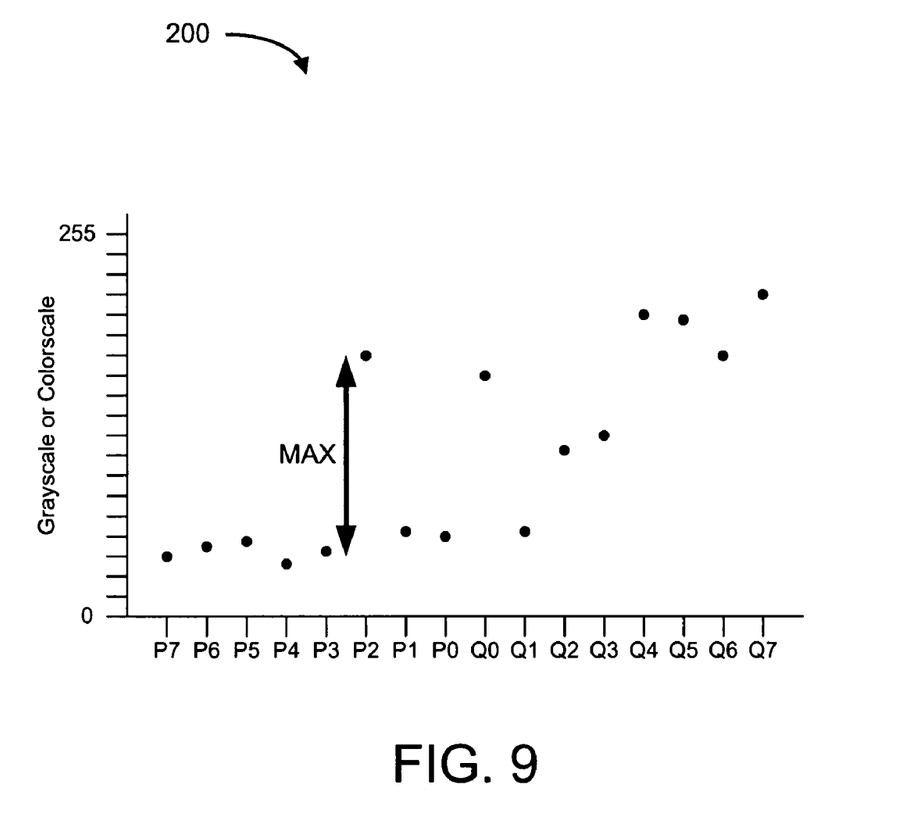
FIG. 9 illustrates a schematic diagram of one embodiment of a pixel map for a line of pixels extending across adjacent macroblocks of pixels.

FIG. 9 illustrates a schematic diagram of one embodiment of a pixel map 200 for pixels 116 of a pixel line 118 extending across adjacent macroblocks 112 and 114. The horizontal axis of the pixel map 200 indicates the pixel designations, and the vertical axis of the pixel map 200 indicates an approximate grayscale or colorscale value for each pixel 116.

The depicted pixel map 200 illustrates a maximum pixel jump between adjacent pixels P2 and P3. In one embodiment, the maximum adjacent pixel jump is found using the operations described above. Since the pixel jump between pixels P2 and P3 is the maximum pixel jump, and the pixel jump between pixels P1 and P2 is just less than the maximum pixel jump, pixel P2 may be designated as an edge pixel, depending on the value of the edge weighting factor. Similarly, pixel Q0 may be designated as an edge pixel because the pixel jumps between pixels Q0 and P0 and between Q0 and Q1 are relatively close to the maximum adjacent pixel jump. Hence, using the post processing method 160 described above, new pixel values potentially would not be computed for pixels P2 and Q0 because they are designated as edge pixels. In other words, the de-ringing filter 108 would not be applied to pixels P2 and Q0. However, the de-ringing filter 108 potentially would be applied to the pixels P3, P1, P0, and Q1-Q3 because they are not edge pixels. Accordingly, the de-ringing filter 108 would be applied to six out of the eight middle pixels 116 of the input pixel line 142.

It should be noted that the processing order for each of the pixel lines 118 in a pair 110 of adjacent macroblocks 112 and 114 may vary. As example, the pixel lines 118 may be processed in order from left to right, right to left, top to bottom, or bottom to top. Alternatively, the pixel lines 118 may be processed in another order. Moreover, the combinations of macroblocks for a frame of video data may be processed in any order. In one embodiment, the combinations of macroblocks are processed by designating a current macroblock, and then by processing the current macroblock with the adjacent macroblock to the right, if there is a macroblock to the right. Subsequently, the current macroblock is processed with the adjacent macroblock above the current macroblock, if there is a macroblock above the current macroblock. In this way, all of the macroblocks may be processed starting with the top, left-most macroblock and moving to the right. Then, the next lower row of macroblocks is processed from left to right. This process continues until the bottom, right-most macroblock is processed. Other embodiments of the post processing architecture 100 may implement other processing orders to apply the de-blocking filter 106 and the de-ringing filter 108.

Figure 10:
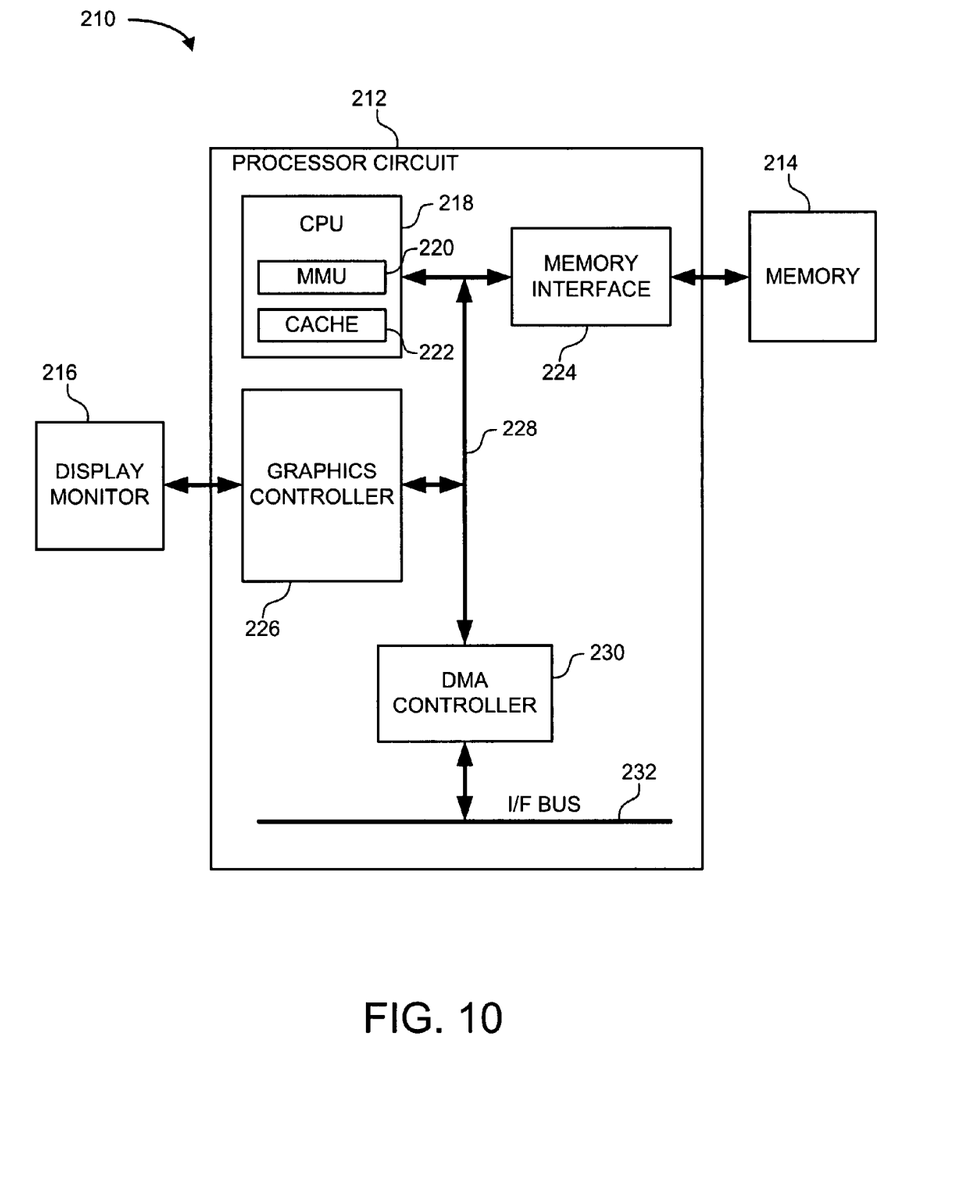
FIG. 10 illustrates a schematic block diagram of one embodiment of a computer system to implement the post processing architecture of FIG. 1.

FIG. 10 illustrates a schematic block diagram of one embodiment of a computer system 210 to implement the post processing architecture 100 of FIG. 1. As shown in FIG. 10, the computer system 210 is a highly integrated system which includes of integrated processor circuit 212, memory 214, and a display monitor 216. In one embodiment, the memory 214 includes read-only-memory (ROM) and random access memory (RAM). The highly integrated architecture allows power to be conserved. Other embodiments may include other components such as a peripheral controller.

The depicted integrated processor circuit 212 includes a processing unit (CPU) 218 which includes a memory management unit (MMU) 220 and one or more instruction and/or data caches 222. The integrated processor circuit 212 also includes a memory interface 224 to interface with the memory 214. The integrated processor circuit 212 also includes graphics controller 226 coupled to the processing unit 218 and the memory interface 224 by a bus 228.

A direct memory access (DMA) controller 230 is also coupled to the bus 228. The DMA controller 230 couples the bus 228 to an interface (I/F) bus 232 to which other core logic functional components (not shown) such as an encoder/decoder (CODEC) interface, a parallel interface, a serial interface, and an input device interface may be coupled. In one embodiment, the DMA controller 230 accesses data stored in the memory 214 via the memory interface 224 and provides the data to peripheral devices connected to the I/F bus 232. The DMA controller 230 also sends data from the peripheral devices to the memory via the memory interface 224.

In one embodiment, the graphics controller 226 requests and accesses video/graphics data from the memory 214 via the memory interface 224. The graphics controller 226 then processes the data, formats the processed data, and sends the formatted data to the display device 216. In some embodiments, the display device 216 may be a liquid crystal display (LCD), a cathode ray tube (CRT), or a television (TV) monitor.

Figure 11:
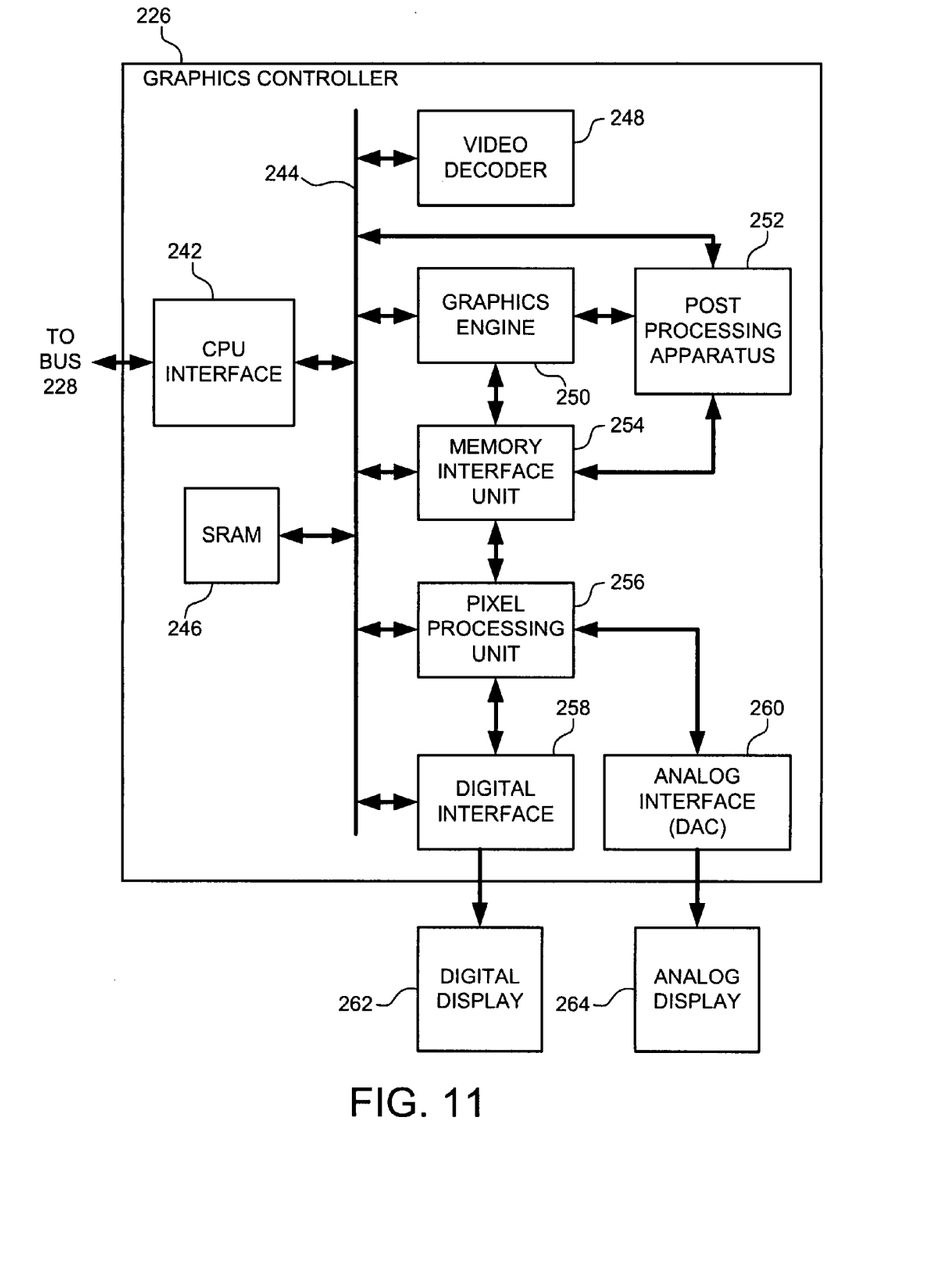
FIG. 11 illustrates a schematic block diagram of one embodiment of the graphics controller of the computer system of FIG. 10.

FIG. 11 illustrates a schematic block diagram of one embodiment of the graphics controller 226 of the computer system 210 of FIG. 10. Some embodiments of the post processing architecture 100 are implemented as part of the graphics controller 226. In general, the graphics controller 226 includes a CPU interface 242 to couple the main bus 224 of the graphics controller 226 to the main bus 228 of the integrated processing circuit 212, described above. The graphics controller 226 also includes static random access memory (SRAM) 246 (or another memory device), a video decoder 248, a graphics engine 250, a post processing apparatus 252, a memory interface unit 254, pixel processing logic 256, a digital interface 258, and an analog interface 260. The digital interface 258 supplies a digital signal to a digital display 262. Similarly, the analog interface 260 supplies an analog signal to an analog display 264. In one embodiment, the analog interface 260 includes a digital-to-analog converter (DAC).

The CPU interface 242 provides an interface to the CPU 218 and the DMA controller 230. Accordingly, the CPU interface 242 routes requests and video/image data received from the CPU 218 to the appropriate destination. In particular, the CPU interface 242 sends register read/write requests and memory read/write requests from the host CPU 218 and the DMA controller 230 to the appropriate modules in the graphics controller 226. For example, memory read/write requests are passed on to memory interface unit 254 which, in turn, reads/writes the data from/to a frame buffer in SRAM 246. The CPU interface 242 also serves as a liaison with the DMA controller 230 to fetch data from the system memory 214 and provides the data to the graphics engine 250 and the memory interface unit 254. In a further embodiment, the CPU interface 242 includes a number of control registers which can be programmed by the CPU 218 to control the post-processing operations. For example, the content of some of the control registers may be used to configure the video decoder 248. In one embodiment, the video decoder 248 is an MPEG-4 decoder. The CPU interface 242 also passes compressed video/image bitstreams to the video decoder 248 to perform image construction and/or decompression.

The frame buffer in the SRAM 246 is used to store a pixmap (i.e., a pixel pattern mapped into the frame buffer) of the image to be displayed on the display device 216 and also may act as a temporary buffer for various purposes. Additionally, the SRAM 246 may allocate memory space for video buffers and transactional registers. The transactional registers can be used to store quantization factors, or quantization scale values, for each block of video image pixel data. If the graphics controller 226 includes a video decoder 248, as shown, then the transactional registers alternatively may be implemented in the video decoder 248 and the quantization factors, or quantization scale values, may be stored in the video decoder 248.

In one embodiment, the graphics engine 250 processes graphics/video image data which is then stored in the buffer in the SRAM 246 based on commands issued by the host CPU 218. The graphics engine 250 also performs graphics operations (e.g., BitBLTs and ROPs, area fills, line drawing) and provides hardware support for clipping, transparency, rotation, and color expansion. In some embodiments, the graphics engine 250 also performs video image expansion, progressive scanning conversion, YcbCr (Yuv) to red, green, and blue (RGB) color-space conversion, and other similar functions through a built-in Stretch Block Transfer (STRBLT) function. In general, the graphics engine 250 frees the CPU 218 from many or all of the video/image display rendering functions. This allows the CPU 218 to perform time-critical or real-time operations.

In one embodiment, the memory interface unit 254 controls all read and write transactions from and to the frame buffer, video buffers, and transactional registers in the SRAM 246. Such read and write requests may come from the host CPU 218 via the CPU interface 242, from the graphics engine 250, from the pixel processing logic 256, from the digital interface 258, and so forth. In addition, the memory interface unit 254 performs tasks associated with memory addressing, memory timing control, and other related tasks.

In one embodiment, the post-processing apparatus 252 removes blocking and ringing artifacts from decompressed video image data to improve the quality of the decompressed video data. The decompressed MPEG video image data can be received, for example, from an optical media player via a serial interface or the video decoder 248. The filtered video image data is then sent to the SRAM 246.

In one embodiment, the pixel processing logic 256 retrieves video and image data from the buffers in the SRAM 246 via the memory interface unit 254. The pixel processing logic 256 then serializes the image data into pixels 116 and formats the pixels 116 into predetermined formats before outputting them to the digital interface 258 and/or the analog interface 260. Accordingly, the pixel processing logic 256 generates the horizontal and vertical display timing signals, memory addresses, read requests, and control signals to access image data stored in the SRAM 246. If the digital display device 262 is a LCD, for example, then the pixel data from the pixel processing logic 256 is sent to the digital interface 258 before being passed on to the LCD. In one embodiment, the digital interface 258 further processes the data by adding different color hues or gray shades for display. Additionally, depending on whether a thin film transistor (TFF) LCD (a.k.a., active matrix LCD) or a super twisted nematic (STN) LCD (a.k.a., passive matrix LCD) is used, the digital interface 258 may format the data to suit the type of display. Furthermore, the digital interface 258 allows color data to be converted into monochrome data in the event a monochrome LCD is used. Additionally, if the analog display device 264 is a cathode ray tube (CRT), the pixel data is provided to the analog interface 260 prior to being sent to the CRT. In one embodiment, the analog interface 260 converts the digital pixel data from the pixel processing logic 256 to analog signals such as RGB signals to be displayed on the CRT monitor.

Figure 12:
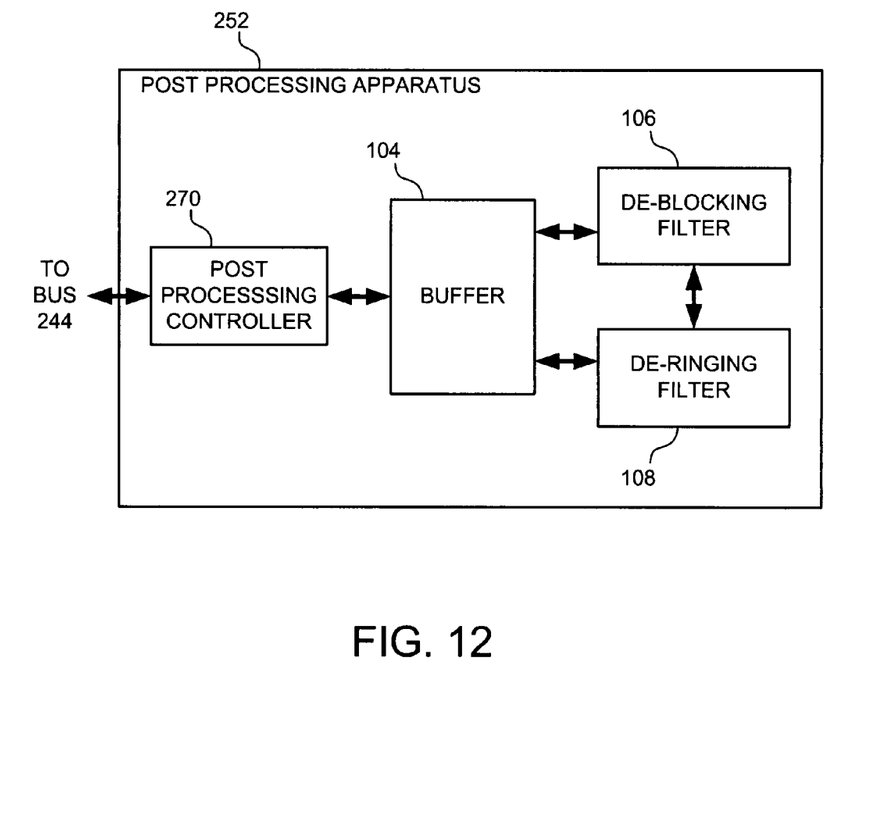
FIG. 12 illustrates a schematic block diagram of one embodiment of the post processing apparatus of the graphics controller of FIG. 11.

FIG. 12 illustrates a schematic block diagram of one embodiment of the post processing apparatus 252 of the graphics controller 226 of FIG. 11. The depicted post processing apparatus 252 includes a post-processing controller 270, a buffer 104 (which performs the same or similar functions as the buffer in the SRAM 246), the de-blocking filter 106, and the de-ringing filter 108. In one embodiment, the post processing apparatus 252 is connected externally to the memory interface unit 254, the SRAM 246, the graphics engine 250, and the CPU interface 242.

In some embodiments, the de-blocking filter 106 and the de-ringing filter 108 are one-dimensional (1D) filters. However, other embodiments may use two-dimensional (2D) filters or a combination of 1D and 2D filters. Moreover, although some embodiments are described in which the de-blocking filter 106 is used prior to the de-ringing filter 108 in the graphics pipeline, other embodiments may use the de-ringing filter 108 without first using the de-blocking filter 106.

During post processing of a video image file, the post processing controller 270 reads the programmed instructions in the registers in the CPU interface 242 to begin post processing a decompressed video frame from a video image file stored in the buffers of the SRAM 246. In one embodiment, the video image file has a Yuv 4:2:0 colorspace format. As explained above, the video frame is divided into 16×16 or 8×8 macroblocks, or pixel blocks, and each macroblock may be further subdivided into smaller sections reserved for Y (luminance), u, and v component data. Other embodiments may use other colorspace formats.

In one embodiment, the registers in the CPU interface 242 also provide control information to the post processing controller 270. The control information indicates, for example, whether the de-blocking filter 106, the de-ringing filter 108, or both are used in the graphics pipeline. The control information also indicates whether 1D or 2D filters are used, whether the horizontal or vertical artifacts are removed first, whether de-blocking process is carried out before de-ringing process, and the memory addresses of input data and output data. In response to the programmed instructions, the post processing controller 270 communicates with the memory interface unit 254 to retrieve a set of video data as well as the corresponding quantization factors, or quantization scale values, from the SRAM 246. Alternatively, the corresponding quantization factors, or quantization scale vales, may be retrieved from the transactional registers in the video decoder 248. In response to a request from the post processing controller 270, the memory interface unit 254 instructs the SRAM 246 to send sets of video data (e.g., each set may contain 10 pixels of data) to the buffer and the corresponding quantization factors, or quantization scale values, if they are stored in the SRAM 246. If the quantization factors, or quantization scale values, are stored in the video decoder 248, then the post processing controller 270 makes a request to the video decoder 248. The post processing controller 270 also forwards the information from the programmed registers in the CPU interface 242 to the buffer.

The post processing controller 270 then initiates the de-blocking and de-ringing operations, as described above. After the de-blocking and de-ringing operations are executed, the post processing controller 270 sends the processed data to a location in the SRAM 246 at a memory address which is stored in the buffer. In one embodiment, the post processing controller 270 monitors and carries out the above processes for the remaining video data in the video frame. To help in monitoring the video data post processing, information related to a set of video data (e.g., information identifying the location of a set of video data in a video data frame, information specifying the order number of a set of video data relative to the order numbers of remaining sets of video data in a frame, etc.) may be sent together with the set of video data, for example, as part of its header information, when the set of video data is travels along post-processing pipeline described above.

It should be noted that embodiments of the post processing method 150 and the post processing architecture 100 may be implemented in software, firmware, hardware, or some combination thereof. Additionally, some embodiments of the post processing method 150 and the post processing architecture 100 may be implemented using hardware or software representations of one or more algorithms related to the operations and functionality described above.

Embodiments of the invention also may involve a number of functions to be performed by a computer processor such as a central processing unit (CPU), a graphics processing unit (GPU), or a microprocessor. The microprocessor may be a specialized or dedicated microprocessor that is configured to perform particular tasks by executing machine-readable software code that defines the particular tasks. The microprocessor also may be configured to operate and communicate with other devices such as direct memory access modules, memory storage devices, Internet related hardware, and other devices that relate to the transmission of data. The software code may be configured using software formats such as Java, C++, XML (Extensible Mark-up Language) and other languages that may be used to define functions that relate to operations of devices required to carry out the functional operations related described herein. The code may be written in different forms and styles, many of which are known to those skilled in the art. Different code formats, code configurations, styles and forms of software programs and other means of configuring code to define the operations of a microprocessor may be implemented.

Within the different types of computers, such as computer servers, that utilize the invention, there exist different types of memory devices for storing and retrieving information while performing some or all of the functions described herein. In some embodiments, the memory/storage device where data is stored may be a separate device that is external to the processor, or may be configured in a monolithic device, where the memory or storage device is located on the same integrated circuit, such as components connected on a single substrate. Cache memory devices are often included in computers for use by the CPU or GPU as a convenient storage location for information that is frequently stored and retrieved. Similarly, a persistent memory is also frequently used with such computers for maintaining information that is frequently retrieved by a central processing unit, but that is not often altered within the persistent memory, unlike the cache memory. Main memory is also usually included for storing and retrieving larger amounts of information such as data and software applications configured to perform certain functions when executed by the central processing unit. These memory devices may be configured as random access memory (RAM), static random access memory (SRAM), dynamic random access memory (DRAM), flash memory, and other memory storage devices that may be accessed by a central processing unit to store and retrieve information. Embodiments may be implemented with various memory and storage devices, as well as any commonly used protocol for storing and retrieving information to and from these memory devices respectively.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

The invention claimed is:

1. A post processing apparatus of a graphics controller to filter decompressed video data, comprising:
    a buffer configured to read a pixel line of video data from memory, wherein the pixel line includes pixels from adjacent macroblocks of the video data
    a de-ringing filter configured to communicate with the buffer, identify a maximum pixel jump between adjacent pairs of pixels in the pixel line, and apply a de-ringing filter to a pixel within a pixel subset of the pixel line in response to a determination that the pixel is not an edge pixel; and
    the de-ringing filter, wherein the determination that the pixel is not an edge pixel includes a comparison utilizing the identified maximum pixel jump;
    wherein the de-ringing filter is further configured to compare a difference between the pixel and an adjacent pixel to an edge threshold, wherein the edge threshold is dependent on the identified maximum pixel jump and an edge weighting factor;
    wherein the de-ringing filter is further configured to compare the following:

$|P_i - P_{i-1}| < P_{max} \times w_e$ and $|P_i - P_{i+1}| < P_{max} \times w_e$ wherein $P_i$ designates a current value of the pixel, $P_{i-1}$ designates a value of a first adjacent pixel, $P_{i+1}$ designates a value of a second adjacent pixel, $P_{max}$ designates the identified maximum pixel jump, and $w_e$ designates the edge weighting factor.

2. The post processing apparatus according to claim 1, wherein the de-ringing filter is further configured to compute the new value for the pixel according to the following:

$$P_{new} = \frac{w_p \times P_i + P_{i-1} + P_{i+1} + P_{bias}}{2 + w_p}$$

wherein $P_{new}$ designates the new value of the pixel, $w_p$ designates a pixel weighting factor, $P_i$ designates the current value of the pixel, $P_{i-1}$ designates a value of a first adjacent pixel, $P_{i+1}$ designates a value of a second adjacent pixel, and $P_{bias}$ designates a predefined bias factor.

3. The post processing apparatus according to claim 2, wherein the de-ringing filter is further configured to clamp the new pixel value within a clamping range, wherein the clamping range is computed according to the following:

$P_{clamp} = (P_i + Q_p, P_i - Q_p)$ wherein $P_{clamp}$ designates the clamping range, and $Q_p$ designates a quantization scale value.

4. A post processing apparatus of a graphics controller to filter decompressed video data, comprising:
    a buffer configured to read a pixel line of video data from memory, wherein the pixel line includes pixels from adjacent macroblocks of the video data;
    a de-ringing filter configured to communicate with the buffer, identify a maximum pixel jump between adjacent pairs of pixels in the pixel line, and apply a de-ringing filter to a pixel within a pixel subset of the pixel line in response to a determination that the pixel is not an edge pixel; and the de-ringing filter, wherein the determination that the pixel is not an edge pixel includes a comparison utilizing the identified maximum pixel jump;

a video decoder coupled to the post processing apparatus, the video decoder to generate a quantization scale value for a current macroblock of the adjacent macroblocks, wherein the de-ringing filter is further configured to compare the quantization scale value to a de-ringing threshold to determine if the de-ringing filter is enabled; wherein the de-ringing filter is further configured to adjust the quantization scale value according to the following:

$$Q_P' = Q_P \times M \times w_d$$

wherein $Q_P'$ designates a new quantization scale value, $Q_P$ designates an original quantization scale value, M designates a post de-ringing factor, and $w_d$ designates a post de-ringing weighting factor.

5. A method for filtering decompressed video to compensate for ringing artifacts, the method comprising:

reading a pixel line of video data, wherein the pixel line comprises pixels from adjacent macroblocks of the video data identifying a maximum pixel jump between adjacent pairs of pixels in the pixel line; and applying a de-ringing filter to a pixel within a pixel subset of the pixel line in response to a determination that the pixel is not an edge pixel, wherein the determination that the pixel is not an edge pixel includes a comparison utilizing the identified maximum pixel jump;

wherein determining that the pixel is not an edge pixel comprises comparing a difference between the pixel and an adjacent pixel to an edge threshold, wherein the edge threshold is dependent on the identified maximum pixel jump and an edge weighting factor;

wherein comparing the difference between the pixel and the adjacent pixel to an edge threshold further comprises performing a comparison according to the following:

$$|P_i - P_{i-1}| < P_{max} \times w_e \text{ and } |P_i - P_{i+1}| < P_{max} \times w_e$$

wherein $P_i$ designates a current value of the pixel, $P_{i-1}$ designates a value of a first adjacent pixel, $P_{i+1}$ designates a value of a second adjacent pixel, $P_{max}$ designates the identified maximum pixel jump, and $w_e$ designates the edge weighting factor.

6. A method for filtering decompressed video to compensate for ringing artifacts, the method comprising:

reading a pixel line of video data, wherein the pixel line comprises pixels from adjacent macroblocks of the video data;

identifying a maximum pixel jump between adjacent pairs of pixels in the pixel line; applying a de-ringing filter to a pixel within a pixel subset of the pixel line in response to a determination that the pixel is not an edge pixel, wherein the determination that the pixel is not an edge pixel includes a comparison utilizing the identified maximum pixel jump; and computing the new value for the pixel according to the following:

$$P_{new} = \frac{w_p \times P_i + P_{i-1} + P_{i+1} + P_{bias}}{2 + w_p}$$

wherein $P_{new}$ designates the new value of the pixel, $w_p$ designates a pixel weighting factor, $P_i$ designates the current value of the pixel, $P_{i-1}$ designates a value of a first adjacent pixel, $P_{i+1}$ designates a value of a second adjacent pixel, and $P_{bias}$ designates a predefined bias factor.

7. The method according to claim 6, wherein computing the new value for the pixel further comprises clamping the new pixel value within a clamping range, wherein the clamping range is computed according to the following:

$$P_{clamp} = (P_i + Q_p, P_i - Q_p)$$

wherein $P_{clamp}$ designates the clamping range, and $Q_p$ designates a quantization scale value.

8. A method for filtering decompressed video to compensate for ringing artifacts, the method comprising:

reading a pixel line of video data, wherein the pixel line comprises pixels from adjacent macroblocks of the video data;

identifying a maximum pixel jump between adjacent pairs of pixels in the pixel line; and applying a de-ringing filter to a pixel within a pixel subset of the pixel line in response to a determination that the pixel is not an edge pixel, wherein the determination that the pixel is not an edge pixel includes a comparison utilizing the identified maximum pixel jump;

comparing a quantization scale value for a current macroblock of the adjacent macroblocks to a de-ringing threshold to determine if the de-ringing filter is enabled, adjusting the quantization scale value according to the following:

$$Q_p' = Q_p \times M \times w_d$$

wherein $Q_p'$ designates a new quantization scale value, $Q_p$ designates an original quantization scale value, M designates a post de-ringing factor, and $w_d$ designates a post de-ringing weighting factor.

* * * * *